United States Patent [19]
Morelli et al.

[11] Patent Number: 5,820,203
[45] Date of Patent: Oct. 13, 1998

[54] DEVICE FOR REDUCING THE FORM DRAG OF VEHICLES

[75] Inventors: Alberto Morelli; Nevio Di Giusto, both of Torino, Italy

[73] Assignees: Fiat Auto S.p.A.; Politecnico di Torino Dipartimento di Energetica, both of Torino, Italy

[21] Appl. No.: 961,238

[22] Filed: Oct. 30, 1997

Related U.S. Application Data

[63] Continuation of Ser. No. 636,762, Apr. 19, 1996, abandoned.

[30] Foreign Application Priority Data

Apr. 19, 1995 [IT] Italy .................................. TO95A0315

[51] Int. Cl.⁶ .................................. B60J 1/00; B60B 19/10
[52] U.S. Cl. ...................... 296/180.1; 296/198; 180/903; 301/6.3; 188/71.6
[58] Field of Search ................................ 296/180.1, 198, 296/208; 180/903; 301/6.3, 6.91; 188/264 A, 71.6; 280/848, 850, 851

[56] References Cited

U.S. PATENT DOCUMENTS

| 1,922,318 | 8/1933 | Mulder ................................. 301/6.3 X |
|---|---|---|
| 2,299,796 | 10/1942 | Chase ..................................... 301/6.3 X |
| 4,334,694 | 6/1982 | Iwanicki ................................... 280/851 |
| 4,372,570 | 2/1983 | Goodall ..................................... 280/851 |
| 4,455,045 | 6/1984 | Wheeler ................................ 296/180.1 |
| 4,772,060 | 9/1988 | Kretschmer ........................... 296/180.1 |
| 5,375,903 | 12/1994 | Lechner ................................ 296/180.1 |
| 5,407,245 | 4/1995 | Geropp .................................. 296/180.1 |
| 5,544,726 | 8/1996 | Topouzian et al. .................. 188/264 A |

FOREIGN PATENT DOCUMENTS

| 601292 | 6/1994 | European Pat. Off. ............. 296/180.1 |
|---|---|---|
| 717269 | 1/1942 | Germany ................................. 296/198 |
| 2750426 | 5/1979 | Germany .................................. 301/6.3 |
| 2096101 | 5/1987 | Japan ........................................ 301/6.3 |
| 204843 | 8/1989 | Japan ......................................... 188/264 |
| 1652166 | 5/1991 | U.S.S.R. ................................... 180/903 |

*Primary Examiner*—Joseph D. Pape
*Attorney, Agent, or Firm*—Sughrue, Mion, Zinn, Macpeak & Seas, PLLC

[57] ABSTRACT

The device includes fan devices associated with each wheel of the vehicle for creating respective auxiliary flows. Conveying devices, associated with the wheel housing, direct the auxiliary flows to a distributor provided with an outlet opening, so that the air flows from the distributors sweep along the bottom of the motor vehicle and exit in the area of the truncated tail portion of the vehicle body in order to create, at least partially, a so-called tailstream produced by a stationary ring vortex.

11 Claims, 3 Drawing Sheets

——— PARALLELEPIPED
- - - PARALLELEPIPED WITH ROUNDED CORNERS
—·—·— TAPERING BODY

DEVICE FOR REDUCING THE FORM DRAG OF VEHICLES

This is a continuation of application Ser. No. 08/636,762 filed Apr. 19, 1996, now abandoned.

BACKGROUND OF THE INVENTION

The present invention relates to a device for reducing the form drag of vehicles.

As is known, the aerodynamic drag coefficient of a car Cx can be regarded as being the sum of three terms:

$$Cx = Cf + Cs + Ci$$

Cf is the friction drag coefficient; Cs is the form drag coefficient; Ci is the induced drag coefficient (induced by the vortical "down-flow" of air, having a substantially longitudinal axis, behind the vehicle).

As is known, the Cx of cars in the 1970's was on average 0.46 in Europe. In the 1980's, there was a drastic reduction of over 30% owing principally to the reduction in Ci.

The distribution of the Cx in the above-mentioned elements was roughly as follows:

In the 1970's:
  Cx=0.03+0.23+0.20=0.46
In the 1980's:
  Cx=0.03+0.21+0.06=0.30

Today, further advances can be made by acting principally on Cs, that is to say, on the "form".

However, at present, for reasons inherent in the increase of the space available for a given size, there appears to be a marked tendency to adopt bodies having parallelepipedal bases, the so-called "monovolumes". The parallelepiped, with the dimensional ratios of its sides used in motor vehicles, and in the presence of the ground, has a Cx of approximately 0.9. If its corners are rounded off, it can be reduced to approximately 0.25. However, bearing in mind the fact that it is necessary to make additions and modifications to the basic parallelepiped, such as:

- wheels and wheel housings;
- ducts for internal fanning flows and heat exchange;
- projections on the bottom for structural reasons and for reasons associated with housing the mechanical members;
- surface projections for producing the glazing, the slots for the doors and the covers, etc., the Cx increases substantially beyond 0.30, with deterioration compared with current values.

BRIEF DESCRIPTION OF THE DRAWINGS

The cause of this impairment is attributable to the increase in the form drag since it is not difficult to hold Ci at unchanged values, that is to say, approximately 0.05. It is well known that this increase is due to the fact that the parallelepiped is a "squat" body, that is to say, a "non-tapering" body, in other words, the areas of its cross-sections vary, as in FIG. 1, much more sharply than in the case of the "tapering body" even when its corners are rounded off.

SUMMARY OF THE INVENTION

The aim of the present invention is to provide a device for reducing the form drag in squat bodies such as, in an extreme case, parallelepipeds, and in any case the so-called "monovolumes".

The benefits that can be obtained with the device according to the invention can also be extended, however, to so-called two- and three-volume configurations provided with a more or less "truncated" "tail".

According to the present invention, the above-mentioned aim and other important aims are achieved with a device having the specific characteristics indicated in the following claims.

BRIEF DESCRIPTION OF THE DRAWINGS

Figure 1:
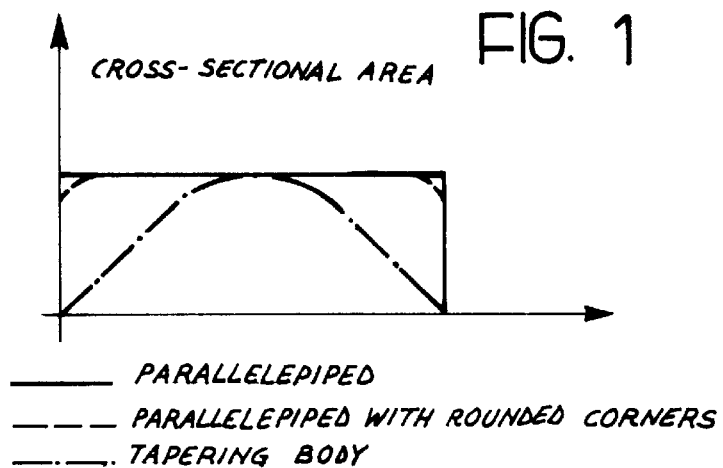
Figure 2:
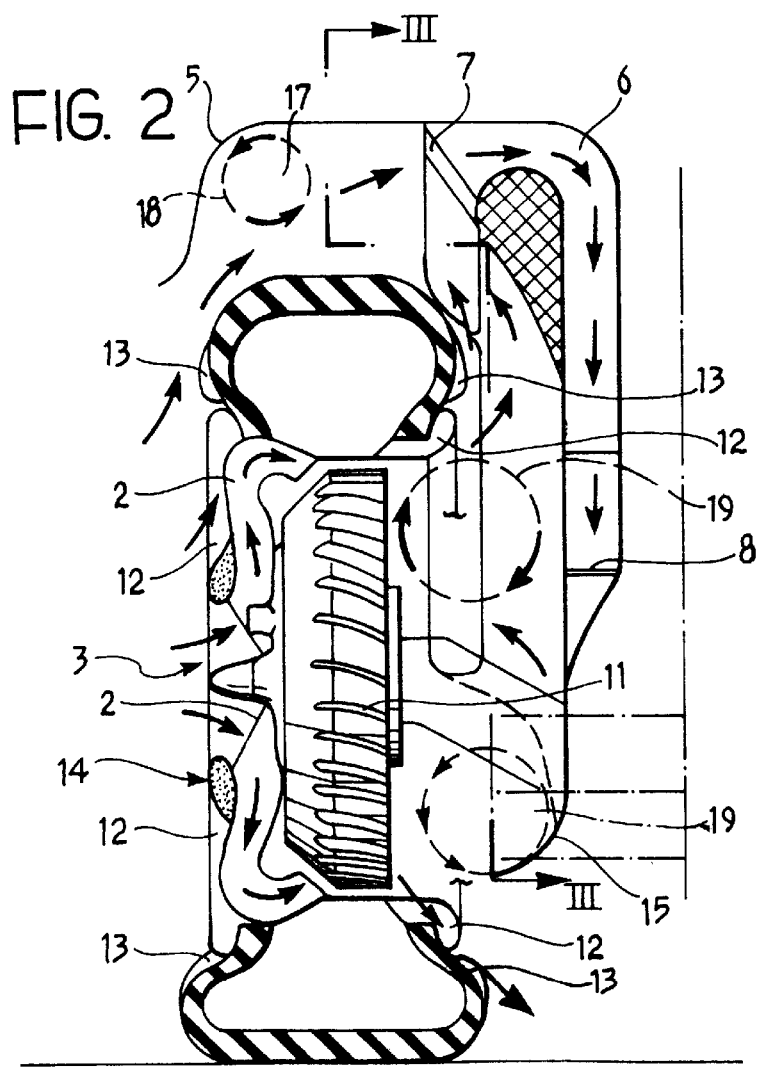
Figure 3:
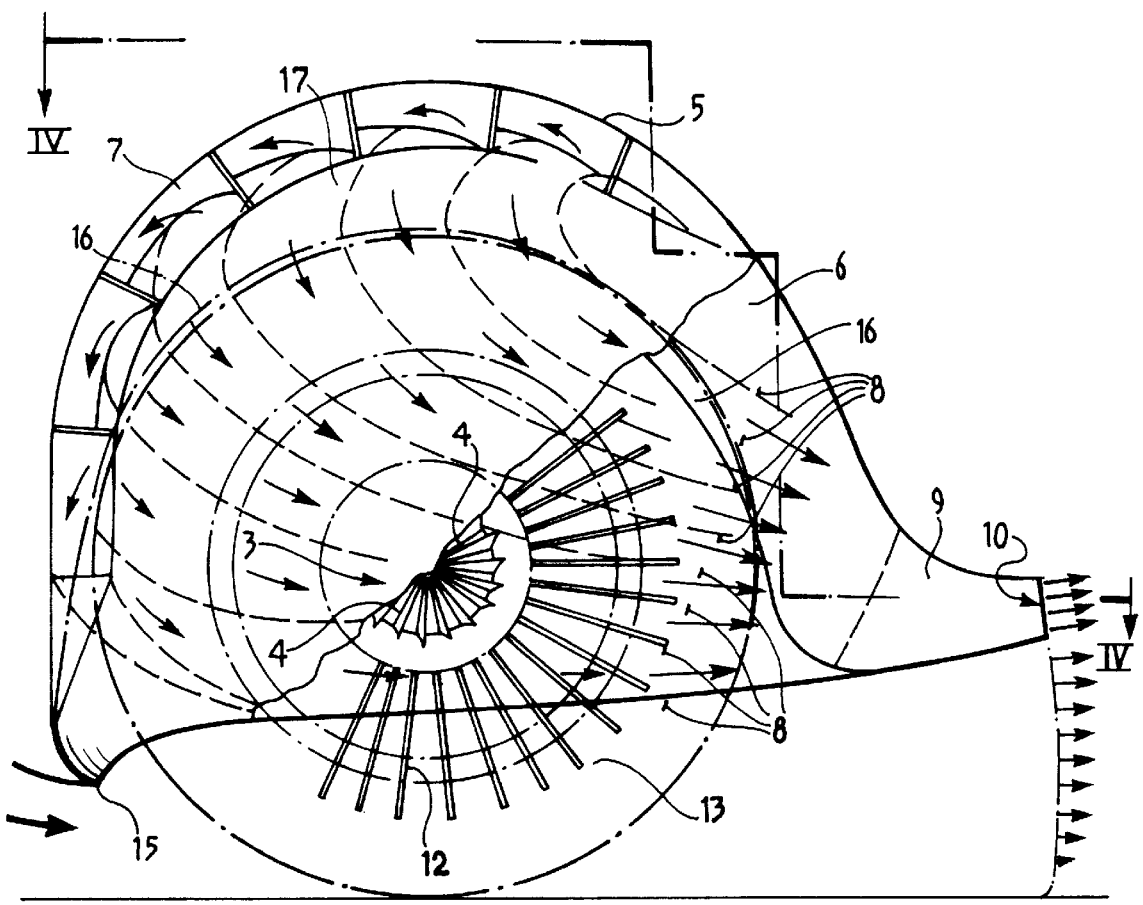
Figure 4:
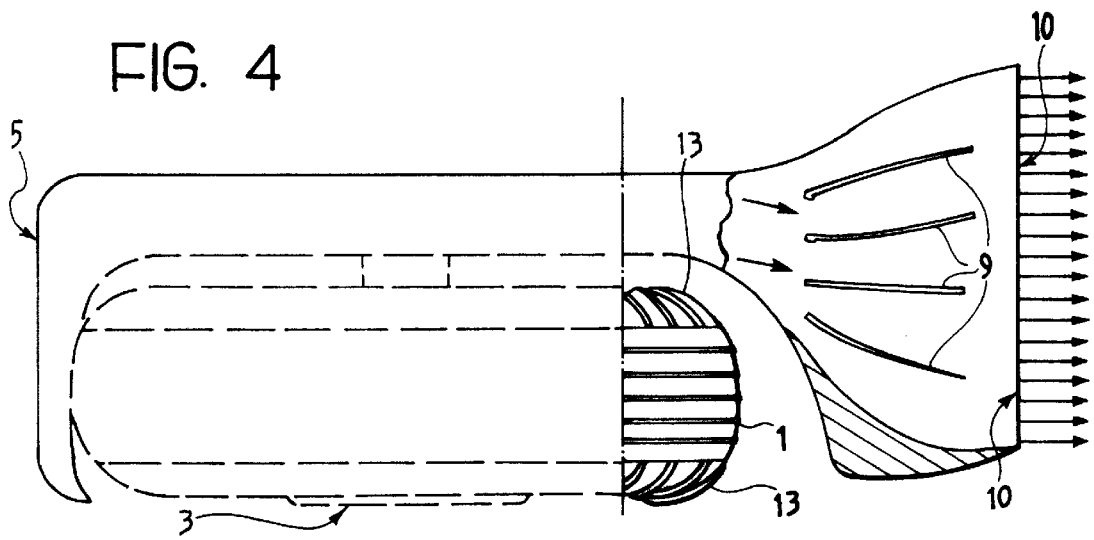
Figure 5:
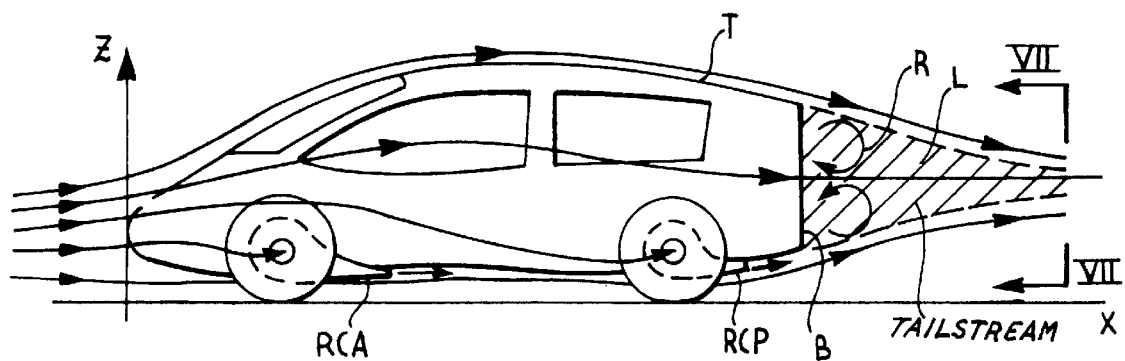
Figure 6:
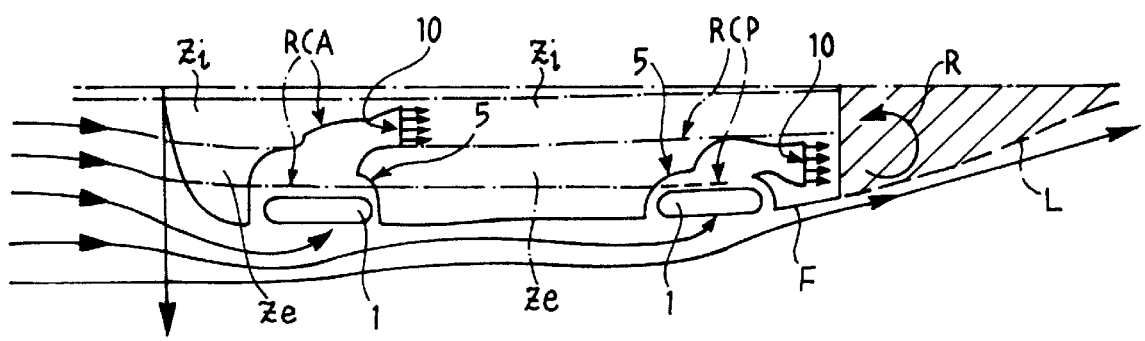

These characteristics and the advantages of the device according to the invention will become clear from the following detailed description and with reference to the appended drawings which are provided by way of non-limiting example and in which:

FIG. 1 is a variation diagram of the areas of the cross-sections as a function of the longitudinal co-ordinate x for "basic bodies" of motor vehicles;

FIG. 2 is a section through the centre of a wheel with an associated wheel housing provided with the device according to the invention;

FIG. 3 is a stepped section along the line III—III of FIG. 2;

FIG. 4 is a stepped section along the line IV—IV of FIG. 3;

FIG. 5 is a side view of a monovolume motor vehicle provided with the device forming the subject-matter of the invention;

FIG. 6 is a partial bottom view of the motor vehicle of FIG. 5; and

Figure 7:
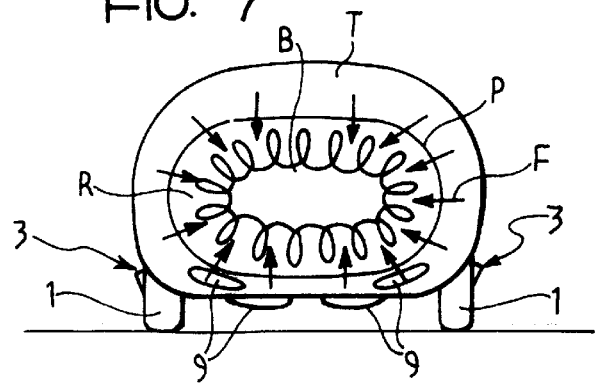

FIG. 7 is a rear view of the vehicle in the direction of arrows VII—VII of FIG. 5.

DETAILED DESCRIPTION OF THE INVENTION

Referring first of all to FIGS. 2 to 4, the wheel 1 of a motor vehicle is provided according to the invention with sets of blades 2, preferably sets of radial blades, the blades 2 are capable of imparting a course indicated by the arrows to the flow captured at the outside by an air intake 3 provided with sets of blades 4 produced in a manner which will be explained hereinafter, and of advantageously conveying the flow to the inside of the wheel housing 5.

The wheel housing is formed with a cavity and is equipped on its inside with a plurality of ducts 6 provided with respective inlet openings 7 which capture the flow created by the wheel and straighten it by means of fixed blade sets 8 delimiting the ducts. The flow, thus straightened, that is to say, devoid of transverse speed components, is introduced into a distributor 9 which is provided with an outlet aperture 10 having a flat cross-section, with a horizontal major axis.

Typically, the flow generated by the rotation of the wheel 1 can be schematised as resulting from two effects:

a) reaction effect caused by the blade sets 2 of the wheel, which impart to the fluid both axial and centrifugal actions by means of the pressures perpendicular to the walls;

b) entraining effect caused by the tangential pressures which are produced when the air comes into contact with the walls, that is to say, the external surface wheel, including the tire.

According to the invention, the two flows combine to create a field of motion in the wheel housing 5 as illustrated in FIGS. 2 and 3, converging in the ducts 6 through the inlet openings 7. The ducts 6 have a threefold aim:

1) to direct the flow towards the distributor 9 under acceleration;
2) to reduce the overall energy losses of the flow by conveying it into channels that have a low resistance because they are provided with smooth sets of blades 8, each of which is dimensioned in such a manner as to cause the currents of the individual ducts 6 to arrive in the distributor 9 at approximately the same speed (and pressure). It may be considered that the energy imparted by the wheel is the same for each emerging angular portion thereof but that, if it is not channelled, it will differ and become dispersed in large part in the vortical flows inside the large wheel housing space;
3) to eliminate the vortices having dimensions greater than those corresponding to the transverse dimensions of the ducts.

In order to increase the two above-mentioned effects a) and b), the wheel 1 may also, according to the invention, be provided with a whole series of structural arrangements. Thus, in order to increase the reaction effect of the blade sets 2, the brake drum is also preferably provided with curved auxiliary blades 11, as shown in the Figure, which are capable of reducing the vortical effect of the exiting flow (analogously, a "fanned" brake disc may be adopted).

But in order to increase the entraining effects, substantially radial auxiliary fins 12 and 13 are arranged on the wheel disc or on the tire. Of course, the fins 13 provided on the tire have to be very flexible and will also act as a protection for the side of the tire. Because the blade sets 4 of the air intake 3 have to be curved in different manners depending upon whether the wheels are arranged on the left or right side of the vehicle, they are preferably produced in one piece with the boss 14, which also acts as the hub cap. The radial blade sets 2 are the same for wheels of the left and right side, with substantial simplification in terms of structure and use.

In addition, in order to prevent the flow generated by the wheel 1 from flowing back down in the reverse direction from the opening of the wheel housing 5, which opening is naturally necessary in order not to obstruct the rotation of the wheel and its rebounding motion, an edge with a pointed corner 15 is preferably produced on the lower contour of the wheel housing.

On the upper contour 16 (FIG. 3), the wheel housing 5 covers the wheel 1 extensively but allows the flow, which is substantially an entraining flow, to penetrate from the external face of the wheel into a cavity 17 of the wheel housing to converge with the flow leaving the internal face by the combined effect of the entraining action of this face and the reaction effect of the internal blade sets, and to be captured by the openings 7. The cavity 17 is in a form such that it can accommodate a stationary vortex such as 18 (FIG. 2). Similar functions are performed by the ring vortex 19 on the internal face of the wheel as a result of the convergence of the entraining and reaction flows on that face.

The flow leaving the distributor 9 is enriched with energy by the work performed by all of the rotating fin sets and blade sets of the wheel and is capable of transferring, by ejection, some of its energy to the air flow affecting the bottom of the vehicle. The normal air flow along the bottom of the vehicle is substantially drained of energetic potential owing to the losses it suffers on sweeping along the bottom of the vehicle where there are projections formed by elements designed in accordance with manufacturing, structural, etc. criteria, and hardly ever in accordance with aerodynamic criteria. These elements therefore oppose the flow with substantial resistance.

To be more precise, with reference to FIGS. 5 to 7 in which three views of a monovolume motor vehicle are shown by way of example, it can be seen that each wheel-conveyor unit, such as RCA and RCP, affects its own limited area of the bottom, the zones $Z_i$ and $Z_e$, respectively, with the aim of rendering uniform the energetic potential of the air flow which is about to become separated from the surface of the bottom in the area of the rear truncated portion B.

The dimensioning of the entire system according to the invention is preferably such as also to render the above-mentioned energetic potential uniform with the flow which sweeps along the other surfaces of the vehicle, the side panels F and the roof T, the trace of which, with the surface of the truncated portion, defines the perimeter P thereof. It is thus possible, by ensuring that similar speed and pressure conditions are established along the entire peripheral contour of the truncated portion, to create a ring vortex R that is stationary with respect to the vehicle. This vortex, which is therefore "supported" on the truncated portion, induces in the external flow a convergence similar to that which would be obtained if the (solid) tail of the vehicle had not been removed from the truncated portion.

The broken lines L in FIGS. 5 and 6 indicate the line of separation between the external field of motion and the internal field of motion, which is almost stagnant with respect to the vehicle, creating a sort of tailstream which is very beneficial in terms of reducing the total drag coefficient $C_x$ of the vehicle.

Of course, in order for the total energy benefit to be positive also, it is necessary for the energy saving obtained with the reduction in the coefficient $C_x$ of the vehicle to be greater than the supplementary energy required at the wheels by the blade sets.

In this connection, it should be noted that the suction by the air intakes provided on the wheels also serves to remove the boundary layer of the flow on the lower portion of the side panels, which is generally fairly thick owing to the previous separation of the flow in the converging portion of the side panels which is located behind the wheels.

It should also be pointed out that the wheels are normally already provided with devices for the fanning thereof and, above all, for cooling the brakes. Therefore, the device forming the subject-matter of the present invention also replaces the above-mentioned device because it is also used to cool the brakes and wheels.

Naturally, the principle of the invention remaining the same, the details of construction and forms of embodiment may vary widely with respect to those described and illustrated by way of non-limiting example, without thereby departing from the scope of the invention defined in the following claims.

What is claimed is:

1. A device for reducing the form drag of a vehicle having an upper surface, side surfaces, a bottom surface and a truncated tail portion, said vehicle having wheel housings and a rotatable wheel mounted in each housing, said device comprising fanning means operatively connected with each wheel of the vehicle for creating auxiliary air flows and conveying means connected to each wheel housing and comprising a distributor provided with an outlet opening in the direction of said truncated tail portion, each conveying means directing an auxiliary air flow from each wheel housing to said outlet opening wherein said outlet openings are substantially laterally offset relative to each other to provide a uniform flow of air along a bottom edge of said truncated tail portion of cooperation with air flows along said upper and side surfaces of the vehicle to facilitate creation of a stationary ring vortex.

2. A device according to claim 1, wherein the fanning means operatively connected with each wheel are constituted by at least one substantially radial blade set causing a reaction effect which imparts to the airflows both axial and centrifugal actions.

3. A device according to claim 2, wherein the wheels have respective hub cap bosses with said fanning means including air intake means having curved blade sets of one piece construction with the hub cap boss of the respective wheel.

4. A device according to claim 1, wherein the conveying means connected to each wheel housing comprise a plurality of ducts which converge in the distributor and wherein the distributor is provided with a flattened horizontal outlet opening capable of creating a substantial entraining effect on a normal air layer sweeping along the bottom surface of the vehicle.

5. A device according to claim 1, wherein the transverse extent of the outlet openings of the distributors effect substantially the air flow of a bottom peripheral portion of the truncated tail portion, the energetic potential of air flow at the bottom peripheral portion being increased in order to render it uniform with air flow along remaining peripheral portions of the truncated tail portion.

6. A device according to claim 4, wherein the wheel housing includes a cavity, the plurality of ducts being delimited in the cavity of the wheel housing by corresponding fixed blades which are capable of directing the auxiliary air flow towards the distributor, under acceleration, of reducing the overall energy losses of the air flow and of eliminating the vortices having dimensions greater than those corresponding to the transverse dimensions of the ducts.

7. A device according to claim 6, wherein the blades have dimensional means for causing the currents of the individual ducts to arrive in the rear distributor at approximately the same speed and pressure.

8. A device according to claim 2, wherein each wheel comprises a brake drum having an auxiliary blade set thereon for increasing the reaction effect of the radial blade set.

9. A device according to claim 1, wherein said fanning means comprises fins on a wheel disc which are capable of increasing the effect of entraining the flow produced as a result of the air coming into contact with the wheel.

10. A device according to claim 1, wherein each wheel housing is equipped with a lower contour having a pointed corner.

11. A device according to claim 1, wherein a portion of the auxiliary airflows is used for cooling the brakes and the wheels.

* * * * *